United States Patent Office 3,570,314
Patented Mar. 16, 1971

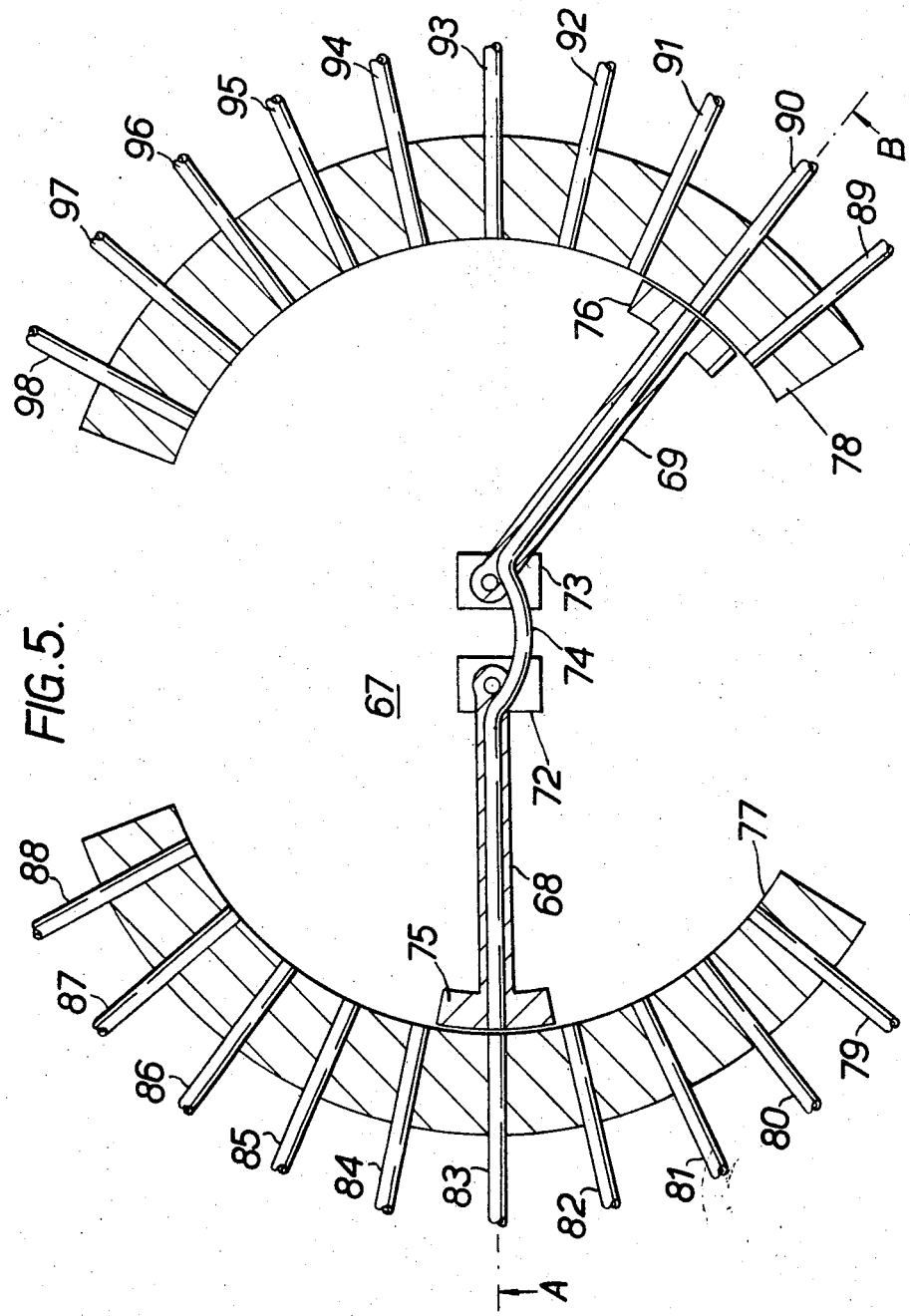

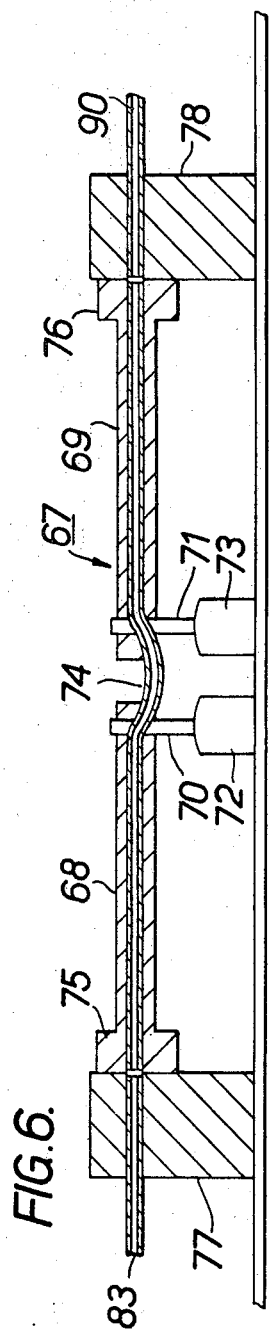
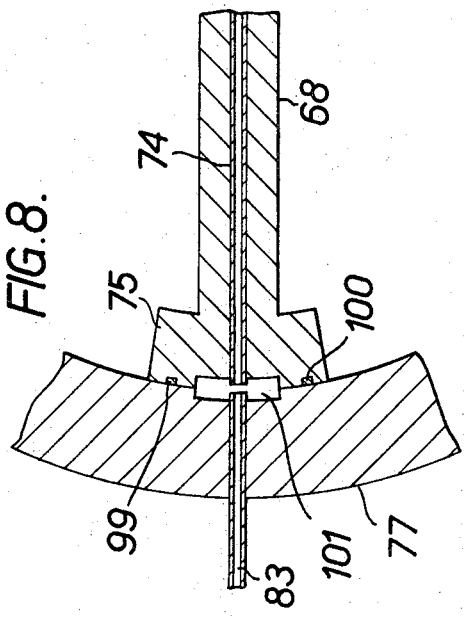
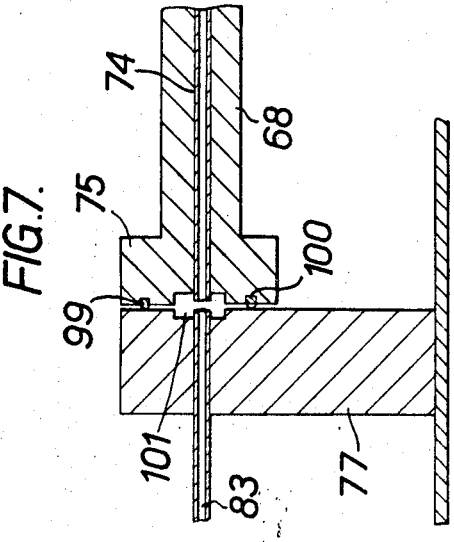

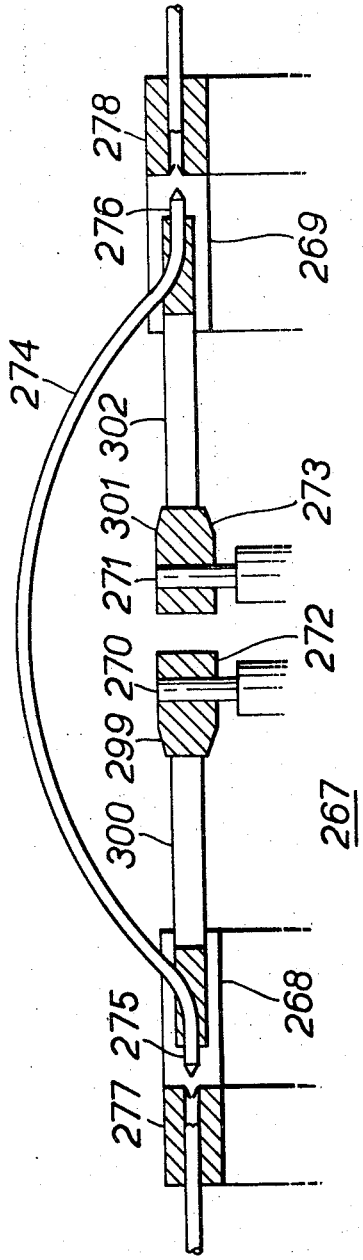
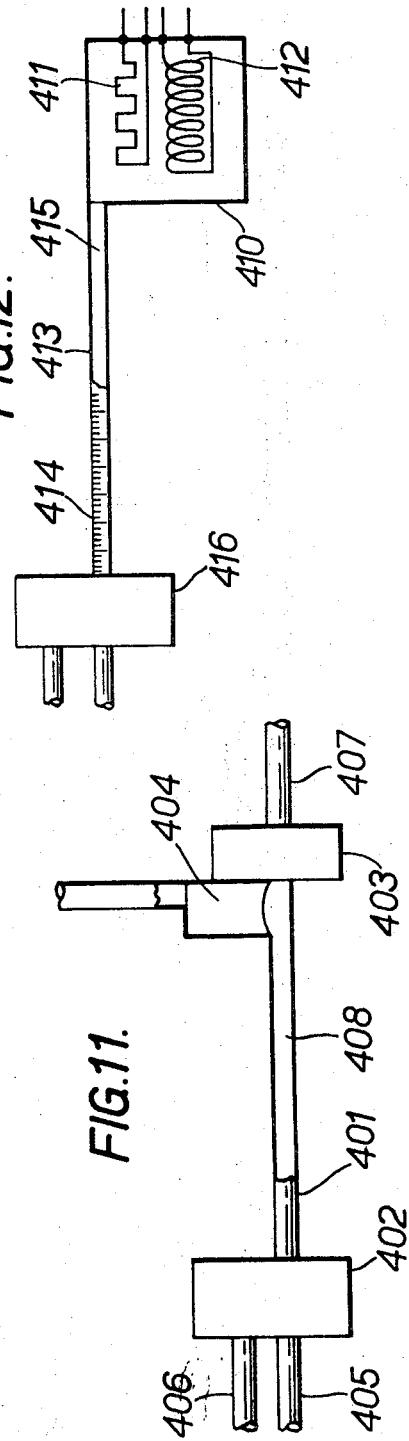
FIG.10.
FIG.11.
FIG.12.

3,570,314
VALVING ARRANGEMENT FOR AUTOMATED MATERIALS ANALYSIS
Maurice Wagner, 49 Blvd. Royal,
Luxembourg, Luxembourg
Filed Aug. 23, 1968, Ser. No. 754,869
Claims priority, application Luxembourg, Aug. 28, 1967,
54,388
Int. Cl. G01n 1/14
U.S. Cl. 73—422                                    15 Claims

ABSTRACT OF THE DISCLOSURE

A distributor for liquids includes at least a pair of small nonwetting tubes placed in aligned relationship. The tubes are spaced apart only a small distance so that under certain conditions the liquid will bridge the gap between effecting a total transfer of a liquid drop from one to another. A first tube can be selectively aligned with any of a series of second tubes so that samples of liquid from a single source can be routed to any one of a plurality of analyzers. Also the samples may be withdrawn from a plurality of sources. Several arrangements for measuring doses are also disclosed.

BACKGROUND OF THE INVENTION (1) Field of the invention

The present invention relates to the fully automatic chemical and/or physical analysis of materials, particularly for medical purposes.

(2) Description of the prior art

In the course of the rationalization of a factory, testing station or laboratory it is important that in order to save labour the analyses required daily should be carried out as rapidly and automatically as possible, whether their object is to monitor and control the production process continuously or to obtain a number of part results with the maximum rapidity and, if possible, simultaneously, in order to gain fresh knowledge therefrom.

In the medical field likewise it is indispensable and often of vital importance to life to carry out as quickly as possible a number of analyses of products secreted by the human or animal organism, in order to prepare a diagnosis.

Although a number of appliances are known, by which certain partial aspects of materials can be determined or analyzed with a relative high degree of accuracy, it has hitherto not been possible to combine these appliances in one and the same complete apparatus. An obvious disadvantage of prior art material analyses techniques is, accordingly, that every individual analysis has to be carried out separately and by highly qualified personnel. This not only renders the analyses considerably more expensive but also means that the human factor often detracts for their accuracy.

Owing to shortage of personnel it is often impracticable to equip a laboratory with a large number of different analysis appliances. The financial outlay incident to establishment of an analysis facility is accordingly determined not by the cost of the necessary equipment itself but by the availability of further personnel.

Furthermore, with a sudden increase in the number of analyses to be carried out it often happens that the capacity of a laboratory is exceeded, so that individual results of importance to production or to the preparation of a diagnosis simply cannot be obtained.

At present two different kinds of apparatus are known which enable a complete analysis of a material to proceed partly automatically. In one of these appliances a number of test tubes are stacked in rotating vessels or containers and prepared for the analysis. Certain separate processes in the analysis to be effected, such as the supply of reagents are carried out in different places, to which the containers must in each case be carried by hand and set into position. The individual process in question may be carried out at each location more or less automatically. The "container method" is obviously not suitable for the complete automation of an analysis.

In another known apparatus the individual samples to be analyzed are continuously introduced into a flexible tube, in which they are separated from one another by air bubbles. The reagents are introduced in the same manner into a second flexible tube. The two tubes are interconnected at a certain point at which the reagents are combined with the samples. The combining can, for example, be performed by a diaphragm which separates the tubes from each other and through which part of the samples can flow and combine with the reagents.

The main disadvantages of such continuous tube type apparatus resides in the fact that a continuous flow must be maintained in both flexible tubes at all times, making cleaning operations impossible during the analysis. Superfluous or undesirable substances, such as precipitated albumen, thus cannot be removed from the tube.

Also, since it is impossible to interrupt the continuous process, no rectification (e.g. re-dosage) can be carried out. The examination of the analysis must either be carried out manually or performed by means of an expensive integrating apparatus. Furthermore, it is only a few of the known reactions that can be produced by this apparatus.

SUMMARY OF THE INVENTION

The purpose of the present invention is to overcome the above-discussed disadvantages and to provide a process and apparatus useable thereon with which a number of analyses can be carried out completely automatically.

The invention enables the foregoing and other objects to be achieved by providing a system in which the individual appliances or apparatus required for one or more analyses are interconnected by a system of pipes or flexibles tubes through which aqueous or gaseous solutions can be conveyed. The present invention also contemplates distributing devices which are incorporated into the system of pipes or flexible tubes, the distribution devices enabling communication to be established selectively with the different individual appliances. Devices for the cleaning of the apparatus are also connected to the said system of pipes or flexible tubes and devices for the production of a pressure or suction inside the system of pipes or flexible tubes is provided for the purposes of the further transport of the solutions. All the movable parts of apparatus in accordance with the present invention are provided with suitable driving devices which are connected with a central system for the control of the operating sequences required for one or more analyses.

In a preferred embodiment, one important aspect of the present invention resides in the fact that the system of pipes or flexible tubes for the transport of the solutions inside the analyser may be constructed from capillaries.

In this connection operation of the invention is based on the fact that a column of liquid, within a substantially horizontal capillary, can be sharply demarcated on both sides, and also that the transfer of this column of liquid from one capillary to another capillary situated opposite to and at a slight distance from the first capillary is carried out continuously, and without any loss of material, by the "capillary effect" produced by surface tension.

The present invention is neverthlees not confined to the use of capillaries, and the system of pipes or flexible tubes in the analyser can also be constructed with pipes or flexible tubes of greater internal diameter.

Also in accordance with the present invention, the connection to individual appliances already known in themselves, for the performance of an analysis, is produced by means of novel connection pieces. Furthermore, changes in the various fluid flow connections within the system of pipes or flexible tubes to which the invention relates is carried out by means of switch-over devices of a novel kind, such devices being operated from the central control system.

BRIEF DESCRIPTION OF THE DRAWING

The invention will be explained below in conjunction with the examples of preferred embodiments illustrated in FIGS. 1–18 of the accompanying drawings.

FIG. 5 is a cross-sectional top view of a first embodiment of a distributor in accordance with the invention.

FIG. 6 is a cross-sectional side elevation view of the distributor according to FIG. 5.

FIG. 7 is an enlarged cross-sectional view of the head of a distributor according to FIG. 6.

FIG. 8 is an enlarged, cross-sectional top view of the distributor head according to FIG. 7.

FIG. 10 is a cross-sectional side view of the distributor according to FIG. 9.

FIG. 11 is a side view of a dosing device which may be incorporated into the analyser of the present invention.

FIG. 12 depicts a mercury pump for the dosing of small quantities of liquid.

DESCRIPTION OF THE PREFERRED EMBODIMENT

Figure 1:
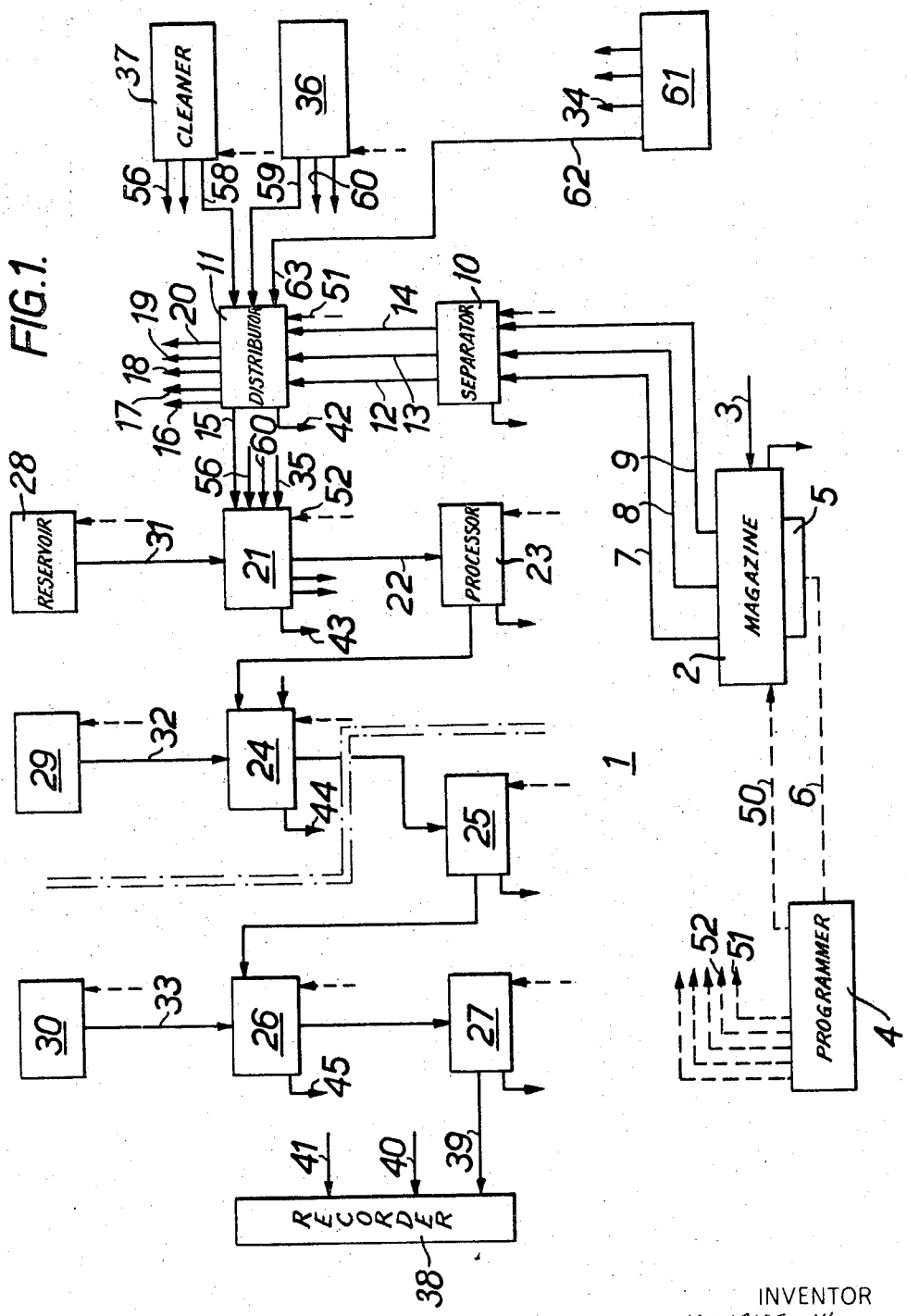
FIG. 1 is a circuit diagram showing the principal design of an analyser in accordance with the present invention.

FIG. 1 provides a circuit diagram showing the principal design of an apparatus, in accordance with the present invention, for the performance of chemical and physical analyses. The analyser 1 consists of individual appliances shown schematically in FIG. 1. It is of advantage for these individual appliances of the analyser 1 to be placed side-by-side according to the "building block" principle, so that each one can be removed and replaced without difficulty.

The apparatus comprises a "stacker" or magazine 2 into which is deposited the samples to be examined (in liquid or gaseous state). The samples may consist, for example, of blood serums or urine and which are introduced manually into the analyser 1 via the inlet 3. The samples to be examined can, for example, be stored in test tubes which are provided with a suitable breech mechanism of any suitable known type. Provision of a breech mechanism enables a given quantity of the samples to be extracted from the test tubes without difficulty. A suitable breech mechanism may employ the connecting means which will be described in connection with the explanation of FIGS. 3 and 4.

The extraction of the samples stored in the magazine 2 and the further course to be taken by the analysis is controlled, both spatially and as regards time, by a central programme register. This programme register is shown schematically in FIG. 1 at 4. The magazine 2 is provided with a keyboard 5, by means of which a required programme is supplied to the programme register via a control line 6, that is to say by means of which the analyser 1 is set to perform the required analytical operation.

The magazine 2 may in some cases be followed by a suitable device 10 by which a predetermined quantity of a sample can be extracted at a certain time in accordance with the preselected programme. The extracted sample material is delivered via feed conduits; such as 7, 8 and 9; to device 10 and is thence conveyed into a distributor 11. As will be obvious, it is also possible for the distributor 11 to be constructed in such a way that the separate device 10 for the extraction of the sample is not required.

Various constructional embodiments of distributor 11 in accordance with the invention are shown in greater detail in FIGS. 5, 6 and 9, 10 and 17, 18. The distributor 11 enables communication to be established between the sample extracting device 10 and a number of appliances required for the performance of the analysis. The distributor inputs 12, 13 and 14 can be selectively connected with any of the distributor outputs 15, 16, 17, 18, 19 or 20. The distributor 11 has, for purposes of explanation, been shown with six inputs and outputs. It can, however, be provided with any desired number of inputs and outputs according to the number of connections to be produced. It is advisable for all the distributors of the analyser 1 to be equipped with the same number of inputs and outputs (even if some of them are not used) in order to provide a uniform structure, in accordance with the "building block principle," and to enable the units to be easily removed and replaced.

It is desirable, particularly if a number of analyses of a sample are to be carried out simultaneously or in succession, for the distributor 11 to be followed by further distributors of the same or similar construction; such further distributors being connected with the distributor 11 via the outputs 15, 16, 17, 18, 19 and 20. Obviously, these outputs can also be connected to other individual appliances for the analyser 1 which will be described hereafter. FIG. 1, for the sake of simplicity, only shows one such additional distributor connection, this being that of the output 15 of distributor 11 with an input of distributor 21.

It is possible in practice for several different outputs of the distributor 11 to be connected with inputs of the distributor 21. This will in each case follow from the particular analysis to be performed. The distributor 21 is connected, via one of its outputs 22, with a known appliance 23, not described in detail here and serving for the processing of the sample. The appliance 23 may consist, for example, of a centrifuge, a heating or cooling chamber, a distillation apparatus, a filtering apparatus, a mixer, etc. Other outputs of the distributor 21 are connected in a similar manner to appliances required for the processing of the sample. The appliance 23 or the distributor 21 can be followed by any desired number of further distributors or appliances for the processing of the sample or for the evaluation of a part-result of an analysis. In FIG. 1, for example, four such devices are shown schematically at 24, 25, 26 and 27. For example, 23 may be a mixing apparatus, 24 and 26 may be distributors, 25 may be a centrifuge and 27 may be a colorimeter.

For the storage of reagents, one or more reserve stocks or reservoirs of reagents are provided, these being shown schematically at 28, 29 and 30 in FIG. 1. The reagents are extracted from the reservoirs via feed conduits 31, 32 and 33 which lead to the distributors 21 and 24 and 26. Obviously, one single distributor can also be used for this purpose and be connected with the various reserve stocks of reagents. As may be seen from FIG. 1, the reservoirs 28, 29 and 30 can be placed in contact, via the distributors 21, 24 and 26 with the samples or substrata appropriately processed in the devices 23 and 25, in order to produce desired reactions.

The further transport of the substrata, reagents etc. within the analyser shown in FIG. 1 is performed by pressure, suction or the effect of gravity. Suitable transmission media, such as gases, air, water, etc. are employed; the transmission media being moved via pumps, pistons etc., in a system of pipes or flexible tubes. A device for the production of pressure for causing movement of material through the apparatus is indicated at 61 in FIG. 1. The pressure producing device 61 has suitable connections to distributor connectors, the output 62 being connected, for example, with the input 63 of the distributor 11, and the output 34 being connected with the input 35 of the distributor 21.

FIG. 1 shows devices 36 and 37 which contain cleaning agents. The devices 36 and 37 are provided with connections to the various distributors of the analyser so that, after the completion of an analysis, the entire apparatus can be cleaned before a further analytical operation is performed. FIG. 1 only shows the connections 58, 59 and 56, 60 between devices 30 and 37 and distributors 11 and 21 respectively.

As noted above, 4 denotes a programme register which controls the course to be taken by the various operations and part-analyses which have been selected by means of a keyboard 5. The programme register is provided with control lines to the various distributors and other individual appliances of the apparatus. These control lines are shown by broken lines in FIG. 1. For example, the programme register 4 is connected by the control line 50 with the magazine 2. Similarly, the distributors 11 and 21 are controlled via the lines 51 and 52 respectively.

If a certain individual appliance of the analyser 1 is always required to perform exactly the same operations, then such applicance can be controlled via a control apparatus directly connected therewith, e.g. via a timing mechanism, and it is sufficient for the programme register 4 to emit an impulse which is transmitted to the appliance control to set up this part-programme.

The reference numeral 38 indicates a recording apparatus which is connected with the individual devices for the evaluation of the results of the analysis and which evaluates and records the results obtained. In FIG. 1, for example, the input 39 of the recording apparatus 38 is connected with the ouput of the colorimeter 27. The current impulses emitted by the photoelectric cell of the colorimeter 27 are fed to a pulse counter which is incorporated in the recording apparatus 38 and which converts them into read-out or print-out signals. Similarly, the inputs 40 and 41 of the recording apparatus are connected with other appliances to enable the evaluation of the result of an analysis.

The distributors 11, 21, 24 and 26 and the individual appliances 10, 23, 25 and 27, are each equipped with a discharge tube, such as those shown by the tubes 42, 43, 44 and 45, via which the plant is evacuated and cleaned, after the performance of a total or partial analysis.

The various individual appliances of the analyser 1 are interconnected, in accordance with the invention, by the aid of a system of pipes or flexible tubes. This tubular system enables analyses to be performed by entirely automatic means and the individual processes to be controlled in such a way that the analyses, once the programme has been set, can be carried out automatically without exerting any action from the outside. The materials to be examined, as well as the reagents required for the analysis, are introduced in a liquid or gaseous state into this system of tubes or hoses and moved in the said system in the form of columns of liquid or gas. As stated hereafter, further transport can be effected either by the action of gravity (this being only possible in the case of liquids) or by means of pressure or suction. The various individual appliances of the plant may be arranged in succession, on the "cascade" principle, or all the devices can be erected in one and the same plane.

According to one aspect of the invention it is advisable to operate at low pressures and to build up the system of tubes or hoses from capillaries. In this case, the invention provides for the use and utilization of the known capillary effect for the purpose of establishing communication between two sepaarte parts of the tubular system, as illustrated by FIG. 2 and as will be described below.

It is known that in a capillary liquids remain sharply demarcated in the horizontal plane. If a column of liquid is moved by pressure or suction, as far as an end of a first capillary tube, a drop will "bulge" more and more, until at last it breaks away. If another tube is situated opposite the aforementioned end of the first tube, at a suitable distance therefrom, the distance being determined by the physical and chemical properties of the column of liquid and of the tube, then the drop in the "supplying" tube does not break away but is sucked into the "receiving" tube by capillary action, causing a flow in this latter tube. The first phenomenon to occur is the "jumping" across of drops. If the pressure behind the given column of liquid is increased, so that the latter is moved more rapidly, there is no longer any formation of separate drops, but rather a combination of drops form a continuous flow. This continuous "flowing across" is assisted by a negative pressure on the suction side.

Figure 2:
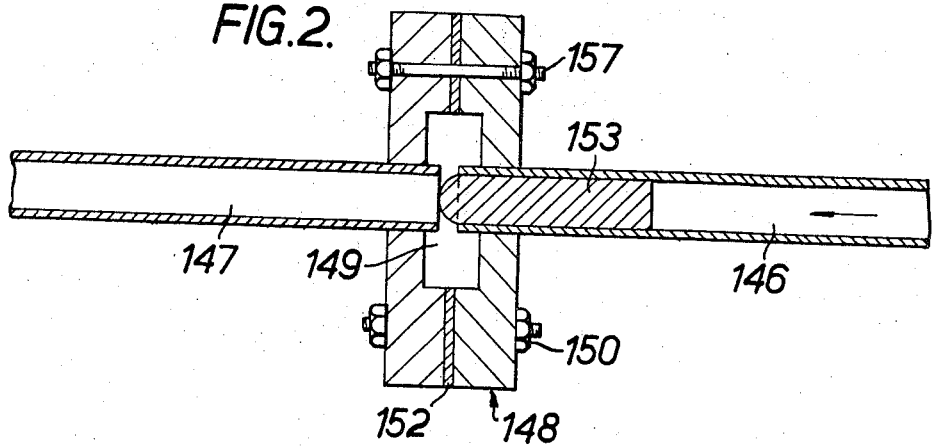
FIG. 2 shows a device for the establishment of a connection between two capillary tubes.

In FIG. 2 the two capillary tubes 146 and 147 of substantially the same diameter are supported in a two-part connecting piece 148. Both parts of the connecting piece 148 are provided with central recesses which form a cavity 149 into which the two capillary tubes 146 and 147 extend to a certain distance, although without coming in contact with each other. By means of screws 150 and 151, or similar easily detachable connecting means, the two separate parts of the connecting piece 148 are firmly pressed together. The cavity 149 is sealed off from the outside, in an airtight manner, by the introduction of a packing 152. The connecting piece 148 can also be constructed as a type of magnetic closure. It is nevertheless not absolutely necessary for the cavity 149 to be hermetically sealed. On the contrary, if it proves difficult to generate, in the capillary 147, a sufficient negative pressure (suction) with respect to the pressure in the capillary 146, it has been found, in accordance with the invention that it is of advantage to operate in an open system, that is to say, either not to seal the cavity 149 with respect to the outside or to provide a special connection to the outside. This makes it possible to subject the cavity 149, via the said connection, and as required, to sufficient pressure or negative pressure with respect to the remainder of the system so as to assure that the medium will continuously flow from one tube to another in all circumstances without moistening the cavity 149. In FIG. 2 the column of liquid 153 to be transferred from the capillary tube or hose 146 into the capillary tube 147 "bulges" gradually, until it forms a drop, after which, it "jumps across," into the "receiving tube" 147, without moistening the cavity 149. In no case will any loss of material occur during the "flowing across," this being of great importance for the accuracy of analysis. It is to be noted that, if the further movement of the column of liquid 153 within the tubular system is effected by the force of gravity, the connecting piece 148 is not required, and it is sufficient, for example, if the two capillary tubes 146 and 147 are situated oppositely of each other and separated by a suitable gap.

Figure 3:
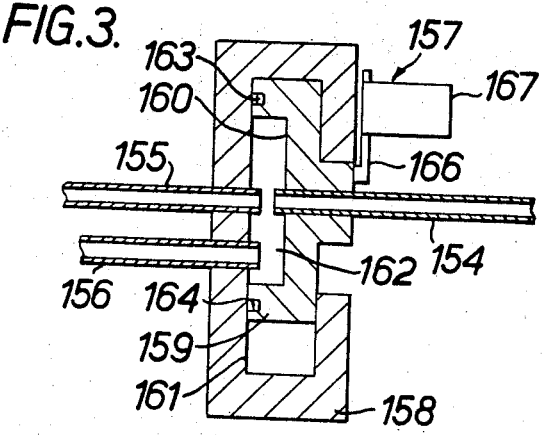
FIG. 3 is a cross-sectional side elevation view of a novel fluid directing means which may be employed with the system of tubes or pipes provided, in accordance with the invention, for the analyser shown in FIG. 1.
Figure 4:
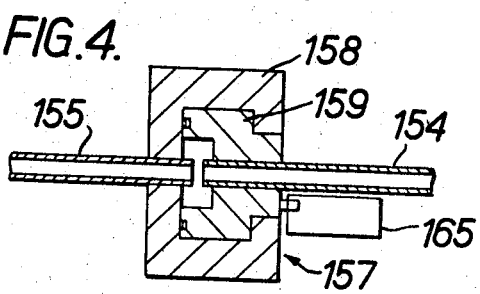
FIG. 4 is a cross-sectional, top view of the directing means shown in FIG. 3.

FIGS. 3 and 4 are a longitudinal and transversal section, respectively, through a directing device 157. Direction device 157 enables communication to be established, on the one hand, between the tube 154 and the tube 155, and on the other hand, between the tube 154 and the tube 156. The director 157 consists of an immovable frame or casing 158 mounted in a fixed position and containing a core piece 159 which can be moved linearly. The core piece 159 is so constructed as to form a cavity 162 between its internal side 160 and one internal side 161 of the frame 158. Cavity 162 is sealed hermetically by a pair of packings 163 and 164 which are mounted in the core piece 159. As described above in conjunction with the connecting piece 148 (FIG. 2), it may prove of advantage to convey an excess pressure or a negative pressure to the cavity 162 through a special feed conduit instead of hermetically sealing the cavity.

Two tubes 155 and 156, leading to individual appliances with which connections are to be provided, are mounted in frame 158. The tubes 155 and 156 extend by a certain distance into the cavity 162. The tube 154, with which the connection is to be produced, is mounted in the core piece 159. Tube 154 likewise extends by a certain distance into the chamber 162. By the movement of the core piece 159 tube 154 can be caused to assume a position in front of one or the other of the tubes 155, 156, so that a continuous connection is produced, only separated by a very narrow gap. The reciprocal movement of the core piece can be effected by means of a suitable driving device, e.g. an electro-magnet 165 connected via a linkage system 166 with the core piece 159. As described above, it is advantageous to use capillaries for the tubes 154, 155 and 156, although the apparatus according to the invention is not exclusively confined thereto.

The construction of a distributor, such as distributor 11 of FIG. 1, in accordance with the invention is illustrated in FIGS. 5 and 6. The distributor 67 consists of two similarly constructed arms 68 and 69, rotatable about the shafts 70 and 71. The arms 68 and 69 can be driven by means of small electric motors 72 and 73 respectively. Other driving devices, such as servo-motors or a timing mechanism, can be used for this purpose. Both the distributor arms 68 and 69 are made hollow in order to accommodate a continuous flexible tube 74 which provides a connection between the two arms 68 and 69. Distributor arms 68 and 69 are respectively provided, at their outer ends, with distributor heads 75 and 76. The construction adopted for a distributor head in accordance with the invention will be described in greater detail in conjunction with the description of FIGS. 7 and 8.

Two partial ring pieces 77 and 78 are positioned relative to the distributor arms in such a way that the distributor head 75 of the distributor arm 68, on the rotation of the latter about the shaft 70, always slides along the ring 77. In the same way, the distributor head 76 of the distributor arm 69, on the rotation of the latter about the shaft 71, slides along the ring 78. Both ring pieces are provided with a number of apertures, to accommodate connecting-hoses which lead to individual appliances, extractors and other distributors. In the distributor 67 shown in FIGS. 5 and 6, the ring 77 is provided with ten outputs 79, 80, 81, 82, 83, 84, 85, 86, 87 and 88, to accommodate the connecting tubes; similarly, the ring 78 is provided with ten outputs 89, 90, 91, 92, 93, 94, 95, 96, 97 and 98. As may be seen from FIG. 5, the distributor head 75 of the arm 68 can be positioned in front of any one of the outputs 79 to 88 on ring 77 by rotation about the shaft 70 whereby the flexible tube 74 is aligned with the output tube concerned (e.g. with the output tube 83, in the position shown in FIG. 5) and provides a continuous connection therewith. Similarly, the distributor head 76 of the arm 69 can be caused to assume a position in front of any of the outputs 89 to 98 of the ring 78 (output 90, in the example shown in FIG. 5). The driving devices 72 and 73 are controlled via the programme register 4 (FIG. 1) in such a way that the arms 68 and 69 assume positions in which they are accurately aligned with the desired output tube. To insure proper positioning, the distributor heads and rings may be equipped with release contacts or end contacts which are connected with the control system of the driving devices.

The construction of the distributor heads 75 and 76 best be seen from FIGS. 7 and 8. As will be evident from these figures the same principle has been adopted, for establishing a connection between the tubes 74 and 83, as in the case of the directing means 157 illustrated in FIGS. 3 and 4. The distributor head 75 is provided with a central recess, the ring 77 being similarly provided with a recess of the same kind at every point at which an input tube or an output tube terminates (that shown in the drawing being the tube 83). Both recesses form a cavity 101 into which the tubes 74 and 83 extend by a certain distance in order to assume a position in which they are aligned opposite to each other. The cavity 101 can be sealed off in an airtight manner from the outside by means of packings 99 and 100. If capillaries are used it will not be necessary to seal off the cavity and it may even be of advantage not to do so, as described above.

Figure 17:
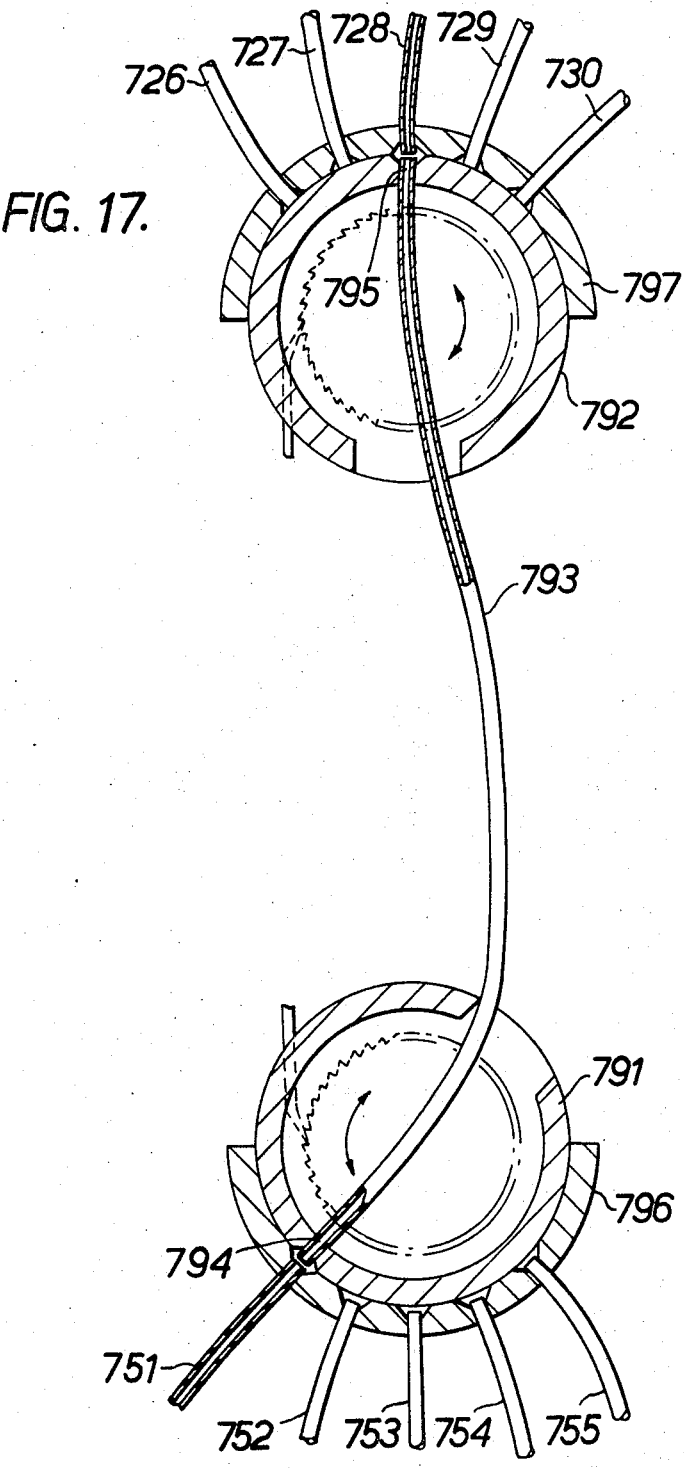
FIG. 17 is a cross-sectional view taken through a further embodiment of the analyser according to the invention.
Figure 18:
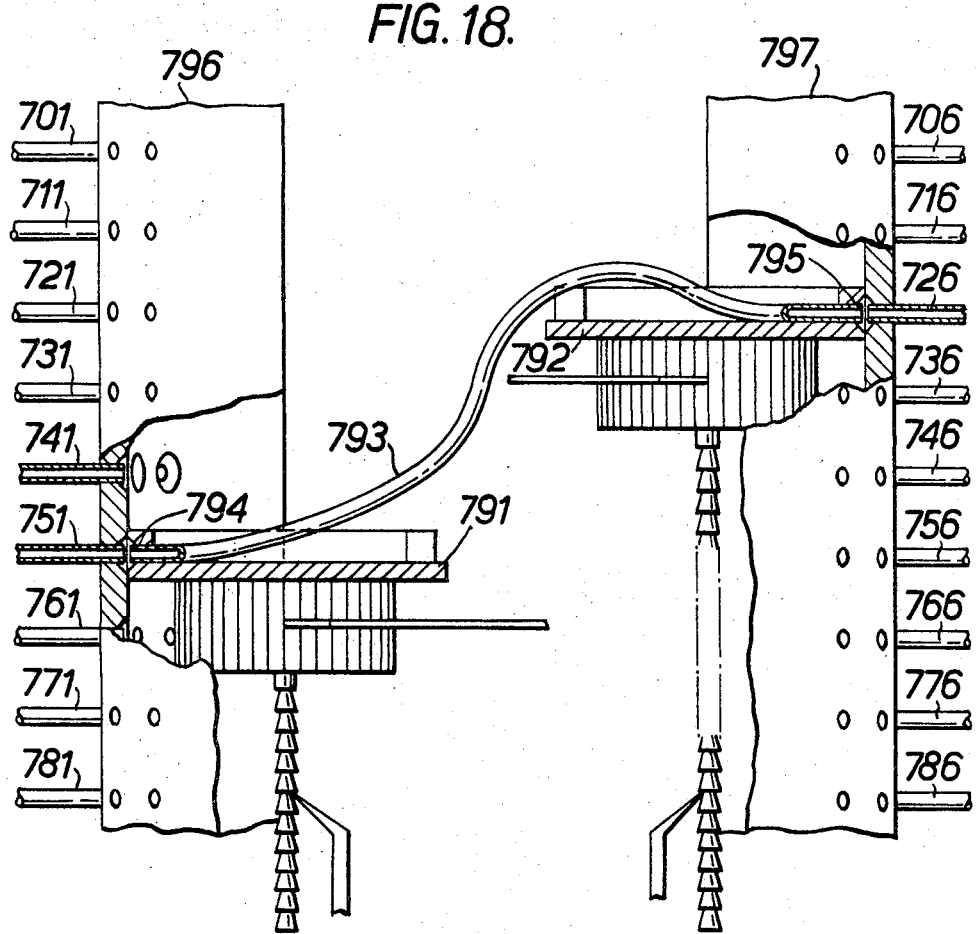
FIG. 18 is a side view, partly in section, of the analyser according to FIG. 17.

FIGS. 17 and 18 show a horizontal and a vertical section, respectively, of a further embodiment of a distributor in which the outputs 701 to 790 are arranged in a number of different planes. The distributor arms consist of two annular discs 791 and 792, the two distributor heads 794 and 795 being interconnected via a flexible tube which is preferably a capillary tube 793. The annular discs can be rotated in both directions in the horizontal plane and can be moved upwards or downwards. Among the suitable driving devices which can be used for this purpose is a rotary magnet (not shown) with a rotary pawl and a lifting magnet (not shown) with a lifting pawl. By rotating the annular discs and adjusting their vertical position a plurality of connections can be produced, i.e. each of the outputs of the distributor 796 can be connected with any one of the outputs of the distributor 797. FIGS. 17 and 18 show an example of how the output 751 is connected with the output 728.

Figure 9:
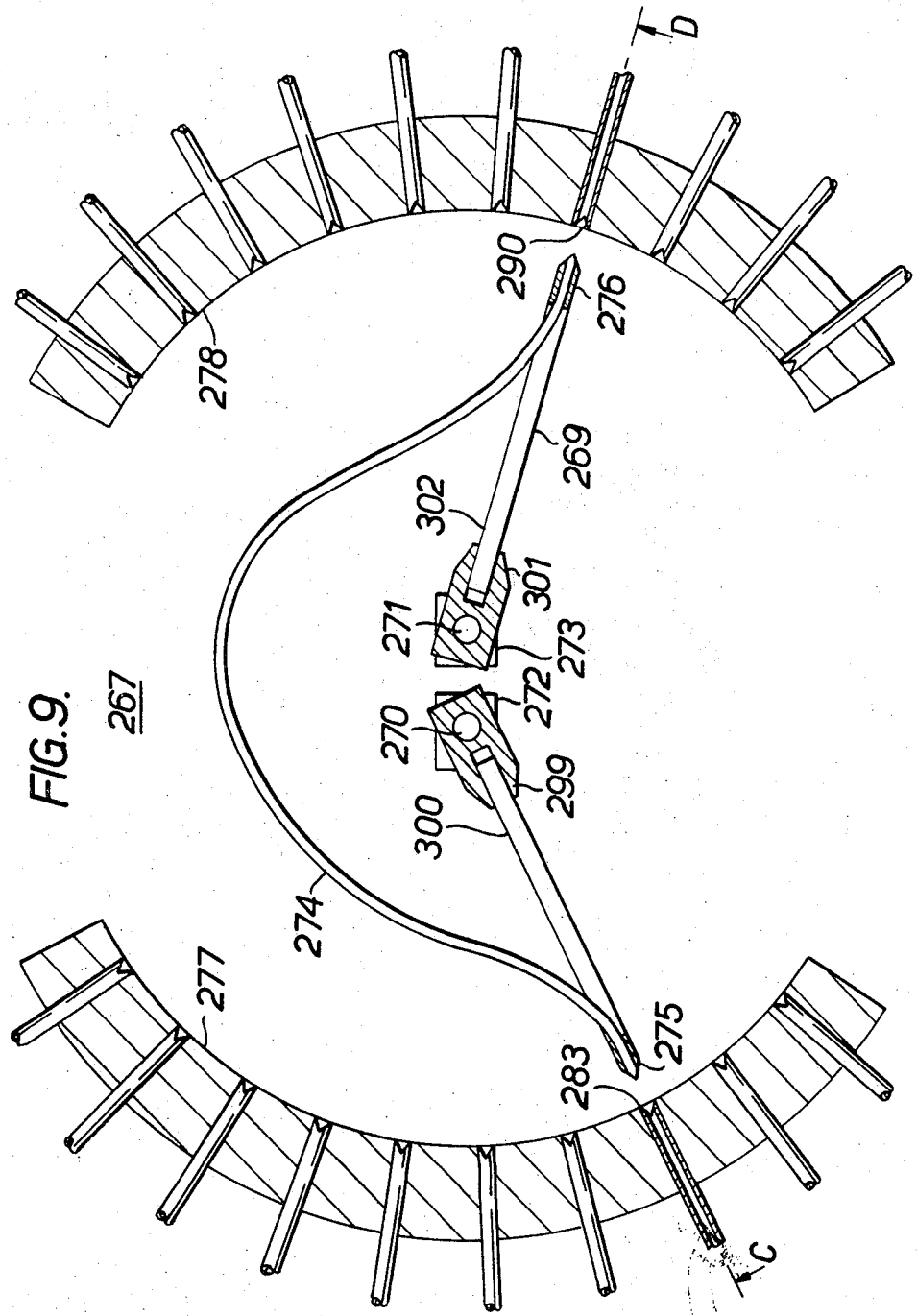
FIG. 9 is a cross-sectional top view of a second embodiment of a distributor according to the invention.

FIGS. 9 and 10 illustrate a further embodiment of a distributor according to the invention, the distributor of FIGS. 9 and 10 being designed particularly for cases in which comparatively high pressures are to be adopted within the tubular system of the analyses to which the invention relates. Thus, the distributor 267 again consists of two distributor arms 268 and 269 mounted in such a way as to be rotatable about the shafts 270 and 271 respectively. Similarly, both distributor arms of this embodiment can be displaced as a whole in their longitudinal axes or else consist, as shown in FIGS. 9 and 10, of two parts 299 and 300, and 301 and 302 respectively, in which case one part, 300 or 302, respectively is displaceable in its longitudinal axis with respect to the other part 299 or 301 respectively. The rotation of the arms about the shafts 270 and 271 and also their longitudinal displacement are performed by two servo-motors 272 and 273.

A connecting hose 274 is attached to the parts 300 and 302 which are displaceable in the longitudinal direction. At its ends the connecting hose 274 leads into distributor heads 275 and 276 respectively. Both distributor heads are of tapering construction and thus form injection nozzles. Around the two distributor arms 268 and 269 are arranged two ring pieces 277 and 278 which are provided with a number of apertures for connecting hoses. By rotating the arm 268 about the shaft 270, the distributor head 275 can be caused to assume a position in front of any one of the apertures of the ring 277 and the arm 269 can similarly be rotated to cause head 276 to assume a position in front of any one of the apertures of the ring 278. In FIGS. 9 and 10, the rings 277 and 278 are shown with 10 apertures each, each of which is intended to accommodate a flexible connecting tube. If, for example, an uninterrupted connection between an aperture 283 of the ring 277 and an aperture 290 of the ring 278 is to be produced, then the distributor head 275 is moved, by the rotation of the arm 268, into position in front of the aperture 283, into which it is introduced by longitudinal displacement, while the distributor head 276 by the rotation of the arm 269, is moved into the position in front of the aperture 290, into which, in its turn, it is introduced by longitudinal displacement. The apertures of the individual annular parts 277 and 278 are constructed in such a way that, after the introduction of the nozzle-shaped distributor head, a connection is obtained which is air-tight.

In FIGS. 11 to 16 devices which may be used in connection with the tubular system according to the invention, in order to perform a certain operation and means for enabling appliances known in themselves to be connected or fitted to the analyser of the present invention are illustrated.

FIG. 11 shows a dosing device which can be incorporated into the tubular system of the analyser according to the invention in a simple manner. The dosing device illustrated here consists of a horizontally positioned capillary tube 401 of a preselected length and internal diameter; the dimensions of the tube determining the quantity of liquid accommodated therein. The capillary 401 is sealed at its ends by directing means or duplexers 402 and 403 which are shown schematically. The directing means 402 may be constructed, for example, in the manner shown in FIGS. 3 and 4. The duplexer 403 however, must be so constructed that the end of the capillary 401 can be sealed off from the remainder of the tubular system in a gas tight manner. Two connecting conduits 405 and 406 are attached to duplexer 402 while a connecting hose 407 leads to the duplexer 403. The connecting conduit 405 leads to a reserve stock, e.g. a stock of reagents, while the connecting conduit 406 can be connected via one or more distributors with any individual appliance of the analyser. The conduit 407 is connected to a pressure producing system, not shown in the drawing. Immediately in front of the duplexer 403, the capillary 401 is connected to a piece of tubing 404 which is positioned vertically thereto and which, at the connecting point, has a considerably greater diameter than that of the capillary 401. The opposite end of piece of tubing 404 is connected to a suction device.

If, by means of the duplexer 403, the respective end of the capillary 401 is sealed off while, by means of the duplexer 402, communication is established between the capillary 401 and the conduit 405, then a liquid 408 can be taken in by suction via the piece of tubing 404 and will fill the capillary 401. The column of liquid 408 does not re-enter the piece of tubing 404, owing to the noncapillarity of the latter, when suction is appropriately limited in duration or magnitude. By switching over the duplexer 402, the column of liquid 408 present in the capillary 401 is separated. If a continuous connection is then produced, by means of the directing means 402 and 403, between the conduits 406, 401 and 407, then the liquid thus dosed can be fed, via the conduit 406, to that particular appliance of the apparatus in which it is required.

For the dosing of small quantities of liquid, use can be made of the dosing device shown in FIG. 12. This figure represents a mercury pump. A vessel 410 contains a known quantity of mercury 415, to which, by the aid of two spiral loops 411 and 412, a certain quantity of thermal energy or refrigerative energy can be supplied. A capillary tube 413 of which the internal diameter is exactly known is connected to vessel 410. The tube 413 is provided with a graduated scale 414 from which the quantity of liquid present therein can be directly read. By the supply of a certain quantity of refrigerative energy, the column of mercury 415 is caused to move back from the capillary 413 into the vessel 414. If the capillary is connected via a duplexer 416 with a reserve stock of liquid, then the column of mercury will suck in the liquid to be dosed thus causing it to enter into the capillary 413. After the desired quantity of liquid, of which the graduation 414 provides a direct reading, has been sucked into the capillary tube, the supply of cold is shut-off and the duplexer 416 switched over. By the supply of heat the mercury is caused to expand into the capillary 413, the liquid thus dosed being forced on its way by the mercury, in front of the latter.

Figure 13:
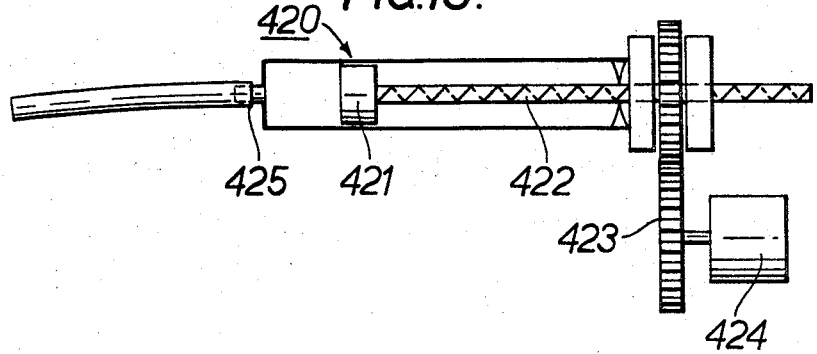
FIG. 13 depicts a dosing device in which a glass syringe is employed.

FIG. 13 illustrates a dosing device in which a glass syringe 420, of a design already known in itself, is used for measuring the quantity of liquid to be apportioned. The shaft 422 of the piston 421 of the glass syringe 420 has the form of an endless screw and is connected via a toothed gearing 423 with a small electric motor 424. Through the needle 425 of the glass syringe 420, which is connected via a feed conduit with a reserve stock by means of the movement of the piston 421, a required quantity of the liquid to be dosed is taken in by suction or redelivered. The movement of the piston 421, which is effected by the electric motor 424, is controlled via the central control system of the apparatus.

Figure 14:
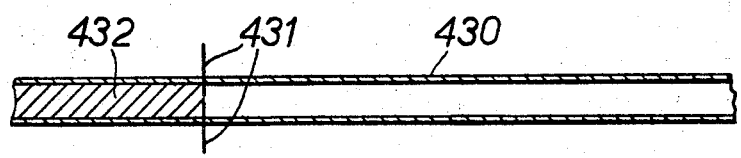
FIG. 14 shows a device for measuring a column of liquid within the tube system of the present invention.
Figure 15:
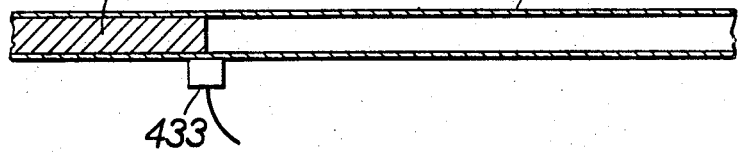
FIG. 15 is a cross-sectional view of another device for measuring a column of liquid within the tube system of the present invention.

FIGS. 14 and 15, show how, for example, a column of liquid can be measured within the tubular system.

In FIG. 14, a pair of electrodes 431 are introduced into a conduit 430 of a known internal diameter, the electrodes being short-circuited on the passage of a column of liquid 432 and consequently emitting a signal used for measuring purposes.

In FIG. 15 the pair of electrodes 431 has been replaced by a photoelectric cell 433. The signals emitted by the pair of electrodes 431 or by the photoelectric cell 433 can also be used for the performance or control of an individual process step of an analysis.

Figure 16:
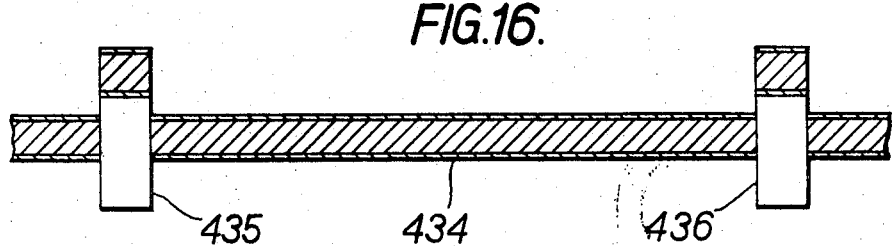
FIG. 16 is a cross-sectional view of a third version of a dosing device.

FIG. 16 shows a dosing device in which a calibrated piece of tubing 434 can be separated, by two duplexers 435 and 436, such as shown in FIGS. 3 and 4 from the remainder of the tubular system. The quantity of liquid present in the piece of tubing 434 is determined by the internal diameter of the tube and by its length. This enables a certain quantity of the said liquid to be separated and supplied via one of the two duplexers 435 and 436 to an individual appliance of the analyser.

The operation of the analyser covered by the invention will be explained below, by reference to the description of an analysis. The operation selected is that of determining the uric acid by Neubauer's method. The instructions for this analysis are as follows:

(a)

1.5 ml. of serum to be thoroughly mixed with
1.5 ml. of uranyl acetate solution, the mixture then being diluted with
2.0 ml. aqua dist., after which it is centrifuged (b)

2.0 ml. of the clear supernatant solution, obtained by operation (a) is then to be thoroughly mixed with
2.0 ml. of aqua dist.,
0.3 ml. of phosphorus tungstic acid reagent and
0.7 ml. of saturated soda solution. After the elapse of 10 min., a further
0.3 ml. of phosphorus tungstic acid reagent is to be added, and the entire mixture thoroughly shaken. After the elapse of a further 15 min. the resulting solution is to be analysed with the colorimeter.

This analysis will now be described in conjunction with FIGS. 1 and 5.

In the magazine 2, for example, there are one hundred serums in test tubes, connected by a special offtake gate to the tubular system of the analyser. By means of the keyboard 5, which in this case may be constructed like a telephone dial, the programme register is instructed, via the control line 6, to perform the above analysis. As soon as one of the channels 7 to 9, e.g. 7, is available, the sampling device 10 receives the order to establish communication with the test tubes.

The apparatus shown in FIG. 5 is selected for the distributor 11. The arm 68 (FIG. 5) of the distributor 11 in FIG. 1 is now caused to move into position opposite the tube 79, while the arm 69 of the distributor is caused to assume a position opposite the tube 89. The feed conduit 89 is connected to a dosing device; such as one of those illustrated in FIGS. 11 to 16. The tube 79 communicates with the feed conduit 12 (FIG. 1) of the sampling device. Through the uninterrupted connection thus provided between the test tubes and the dosing device, 1.5 ml. of serum is taken in by suction and measured. The arm 68 of the distributor 11 then assumes position 83 and transfers the serum to the distributor 21.

The distributor 11 can then be immediately cleaned. For this purpose the arm 68 returns to position 79. The arm 69 assumes positions 90, 91 and 92 in succession. The conduit 90 is connected to a cleaning agent stored in the device 36, the conduit 91 to a supply of water and the conduit 92 to a supply of dry air supplied from devices 37 and 61 to the distributor 11. These cleaning agents flow in succession, via the distributor 11 and the sampling device 10, to an outlet. Subsequently, to or simultaneously with the cleaning of the distributor 11, the serum is conveyed, in a similar manner, via the distributor 21, to a centrifuge 23.

The distributor 21 has the following connections (see FIG. 5): 79 is connected to the distributor 11, 83 to the centrifuge 23, 89 to a suction- and pressure-device 61, 90 to cleaning agents, 91 to water, 92 to air, 93 to a uranyl acetate solution stored in a stock of reagents 28 and 94 to aqua dist.

The further sequence of operations is as follows:

The arm 68 of the distributor 21 assumes position 79, and the arm 69 assumes position 89; the serum is taken in by suction. The distributor arm 68 then moves to position 83 while the arm 69 remains in position 89; by switching the apparatus over to "pressure," the serum is forced into the centrifuge 23. The arm 69 then assumes position 93 and extracts 1.5 ml. of uranyl acetate, via a dosing device incorporated in the channel 31, the said uranyl acetate then being reintroduced into the centrifuge 23 via 83. The arm 69 then assumes position 94 and extracts 2.0 ml. of aqua dist., again via a dosing device, the said water then being conveyed, after readustment to conduit 83, into the centrifuge 23. The centrifuge 23 is equipped, in addition, with a shaking device.

After being shaken thoroughly the solution is centrifuged.

The distributor 24 (FIG. 1) is again of similar design to the distributors 21 and 11. It is provided with the following connections (see FIG. 5): 79 leads to the connector of the centrifuge 23, which connector serves for the extraction and sampling of the supernatant liquid; 80 to the centrifuge connector for the extraction of the sediment; 83 to an incubation magazine 25; 89 to the pressure- and suction-device 61; 90, 91 and 92 to the devices 36 and 37 for supplying detergents, water and dry air; 93 to a container with sodium carbonate; 94 to a container with phosphorus tungstic acid; 95 to a container with aqua dist. The further sequence of operations is as follows:

The arm 68 of the distributor 24 assumes position 79 while the arm 69 moves to a position 89. 2.0 ml. of the clear supernatant solution of the centrifuged mixture is taken in by suction via an apportioning device. The distributor arm 68 then assumes position 83, and the 2.0 ml. of the supernatant liquid is conveyed into the incubation magazine 25, in which it is stored for 25 minutes. The distributor arm 69 then moves into a position 95 and adds 2.0 ml. of aqua dist. via a dosing device and the conduit 83. It then assumes positions 94 and 93 in succession and conveys 0.3 ml. of a phosphorus tungstic acid reagent via an apportioning and mixing device, and through the conduit 83, to the incubation magazine 25, where it is mixed with the remainder of the solution and is stored for a further 10 minutes. During this period the remaining individual appliances of the analyser are available for further analyses. After the elapse of the 10 minute interval, a further 0.3 ml. of phosphorus tungstic acid reagent is added, and incubated for a further 15 minutes. The solution is then conveyed via the distrbutor 26 to a colorimeter 27, and the result of the analysis is evaluated. After the completion of each of the various operations the apparatus is cleaned, via the distributors 21, 24 and 26, in a similar manner to that described above in conjunction with the distributor 11.

The apparatus according to the invention has in this case been described by reference to an analytical operation, but the same apparatus, or one similarly constructed, can naturally be used for synthesis, e.g. of pharmaceutical products.

The advantages offered by the present invention mainly reside in the fact that a number of chemical or physical analyses can be effected simultaneously or in succession automatically and with a high degree of precision.

By comparison with known devices, the present invention enables the analysis to be interrupted at any desired moment. A partial process already carried out can thus be corrected or nullified. The central programme register can, of course, be extended further so that during an analysis it continuously controls the various partial processes, any necessary corrections being carried out automatically.

The analyser according to the present invention also enables accurate dosing; furthermore columns of liquid can be stored for long periods within the capillary tube system without risk of loss of material.

An important advantage resides in the fact that the central control system or program register can consist of an electronic computer since the control, monitoring and evaluation can be effected by means of impulses (dual system). In this connection it should be noticed that, despite the high degree of precision, a certain tolerance is inherent to the capillary system, i.e. when a column of liquid is transferred from one capillary to another, the pressure or suction has to exceed a certain magnitude before the liquid breaks away and passes over, thus enabling "yes" or "no" information to be emitted.

Another advantage of the present invention resides in the fact that, by means of the above-described apparatus for connecting two or more conduits (tubes or pipes), a column of liquid may be subdivided into individual droplets (counting by "yes" or "no" impulses) or, reversely, individual droplets may be combined to form a continuous column of liquid without any loss of material.

The freely suspended droplet or column of liquid between the tubes extending into the cavity is suitable for performing direct biological and physical analysis, i.e. for optical tests, without disturbing container walls, for direct extractions needed i.e. for bacteriological purposes, for investigations on blood clot, i.e. by introducing a filament to determine the phase of coagulation, etc.

The computer not only enables the various programmes for the performances of various analyses to be stored, but also provides a means of storing their results, which can then be released and transmitted at any desired moment. It is thus possible for a number of different organizations (hospitals, firms, chemical laboratories, etc.) to be served from one central point, through a telecommunications system.

While preferred embodiments have been shown and described, various modifications and substitutions may be made thereto without departing from the spirit and scope of the present invention. Accordingly, it is to be understood that the present invention has been described by way of illustration and not limitation.

What is claimed is:

1. Liquid transmission apparatus comprising:
   first conduit means, said first conduit means including a first capillary tube;
   second conduit means, said second conduit means including at least a second capillary tube and a third capillary tube;
   first supporting means connected to said first conduit means for supporting said first capillary tube;
   second supporting means connected to said second conduit means for supporting said second and third capillary tubes, said second capillary tube initially being in spacially displaced and aligned relationship with said first capillary tube; the spacial relationship between the first and second capillary tubes permitting the liquid to be supported by surface tension between the capillary tubes; and
   means connected between the first and second supporting means for producing relative movement between the first and second supporting means and allowing said first capillary tube to be positioned adjacent said third capillary tube in spacially displaced and aligned relationship thereby permitting the liquid to be supported by surface tension between the spaced first and third capillary tubes whereby the liquid may be transmitted between said first tube and a selected one of the second and third capillary tubes without spillage.

2. The apparatus of claim 1 wherein:
   the means connected between the first and second supporting means and the first and second supporting means define a sealed chamber surrounding the first, second and third capillary tubes.

3. The apparatus of claim 1 further including:
   means connected to the first conduit means for delivering a preselected quantity of fluid to the first capillary tube, the tube having dimensions commensurate with the preselected quantity of fluid.

4. The apparatus of claim 3 further comprising means positioned in said first conduit means for measuring quantities of fluid delivered thereto.

5. The apparatus of claim 4 wherein said measuring means comprises:
   spacially displaced electrodes which pass through the walls of said first capillary tube.

6. The apparatus of claim 4 wherein said measuring means comprises:
   photosensitive means positioned externally of said first capillary tube.

7. The apparatus of claim 4 wherein:
   the measuring means includes a valve positioned in the first capillary tube at the end opposite the end confronting the second capillary tube.

8. The apparatus of claim 3 further including:
   means also connected with the first conduit means for removing the preselected quantity of fluid from the first capillary tube.

9. The apparatus of claim 8 wherein:
   the means for delivering and means for removing are connected to the end of the first capillary tube opposite the end confronting second capillary tube.

10. Apparatus as in claim 1 wherein the confronting ends of said first, second and third tubes are of substantially the same diameter.

11. The apparatus of claim 1 further comprising:
    third conduit means, said third conduit means including a fourth capillary tube;
    fourth conduit means, said fourth conduit means including at least fifth and sixth capillary tubes;
    flexible conduit means interconnecting said first and fourth capillary tubes; and
    means for selectively positioning said fourth capillary tube in spacially displaced aligned relationship with one of said fifth and sixth capillary tubes.

12. The apparatus of claim 1 wherein said second supporting means for supporting said second and third capillary tubes comprises:
    a rigid arcuate member provided with apertures for receiving said second and third capillary tubes.

13. The apparatus of claim 12 wherein said movement producing means comprises:
    a movable elongated arm having an aperture therethrough, said arm having a flange on a first end thereof, said flange having an arcuate outer surface complementary in shape to the inner surface of said rigid arcuate member, said first capillary tube extending into said aperture in said arm so as to be thereby positionable adjacent to the ends of the capillary tubes received in said apertures in said arcuate member.

14. The apparatus of claim 13 wherein said flange is provided with a recess surrounding the end of said first capillary tube and a seal which contacts the facing surface of said arcuate member, said flange cooperating with said rigid arcuate member to define a movable sealed chamber across which fluid may be transferred from said first capillary tube to a selected one of said second and third capillary tubes.

15. The apparatus of claim 12 wherein said first supporting means for said first capillary tube comprises:
    an apertured movable arm, said first capillary tube being received in said aperture;
    conical injection nozzle means at the end of said arm; and
    means for imparting longitudinal movement to said arm whereby said nozzle may be introduced into the apertures in the facing side of said arcuate member.

References Cited
UNITED STATES PATENTS

| | | | |
|---|---|---|---|
| 2,434,723 | 1/1948 | Shook | 23—259 |
| 2,656,847 | 10/1953 | Collins | 137—625.11 |
| 3,008,490 | 11/1961 | Angelos | 137—625.11 |
| 3,011,505 | 12/1961 | Reip | 137—83 |
| 3,137,172 | 6/1964 | Harrison | 73—425.4P |
| 3,171,722 | 3/1965 | Natelson | 73—425.6X |
| 3,265,086 | 8/1966 | Smith et al. | 137—625.11 |
| 3,354,908 | 11/1967 | Levesque | 137—610 |
| 3,386,472 | 6/1968 | Szonntagh | 137—597 |
| 3,143,393 | 8/1964 | Des Hons | 23—253 |
| 3,186,434 | 6/1965 | Hrdina | 137—625.11 |
| 3,401,564 | 9/1968 | Hrdina | 73—421 |
| 3,430,495 | 3/1969 | Burge | 73—423 |
| 3,435,684 | 4/1969 | Smythe | 73—423 |
| 3,443,439 | 5/1969 | Cruz | 73—423 |

S. CLEMENT SWISHER, Primary Examiner

U.S. Cl. X.R.

23—253; 137—597, 625.11, 625.46